(12) United States Patent
Witkemper

(10) Patent No.: US 8,542,112 B2
(45) Date of Patent: Sep. 24, 2013

(54) NAVIGATION SYSTEM WITH PHYSICAL ACTIVITY SAFETY MECHANISM AND METHOD OF OPERATION THEREOF

(75) Inventor: Todd Matthew Witkemper, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 362 days.

(21) Appl. No.: 13/072,566

(22) Filed: Mar. 25, 2011

(65) Prior Publication Data

US 2012/0242486 A1 Sep. 27, 2012

(51) Int. Cl.
*G08B 1/08* (2006.01)
(52) U.S. Cl.
USPC .............. 340/539.13; 340/573.4; 340/573.1
(58) Field of Classification Search
USPC ................. 340/573.4, 573.1, 539.13, 539.2
See application file for complete search history.

(56) References Cited

U.S. PATENT DOCUMENTS

| | | | |
|---|---|---|---|
| 5,323,174 A | 6/1994 | Klapman et al. | |
| 6,005,548 A | 12/1999 | Latypov et al. | |
| 6,057,859 A | 5/2000 | Handelman et al. | |
| 6,226,622 B1* | 5/2001 | Dabbiere | 705/28 |
| 6,747,555 B2* | 6/2004 | Fellenstein et al. | 340/524 |
| 7,402,743 B2 | 7/2008 | Clark et al. | |
| 2005/0068165 A1* | 3/2005 | Kelliher et al. | 340/523 |
| 2006/0154220 A1 | 7/2006 | Toniolo | |
| 2010/0035688 A1 | 2/2010 | Picunko | |

* cited by examiner

*Primary Examiner* — Travis Hunnings
(74) *Attorney, Agent, or Firm* — IP Investment Law Group

(57) ABSTRACT

A method of operation of a navigation system includes: monitoring a participant's movement, the participant's movement is movement to a sequence of locations; identifying a movement area based on the participant's movement in a physical activity; generating a safety zone encompassing the movement area; monitoring an intrusion into the safety zone; and generating a notification of a dangerous situation based on the intrusion for displaying on a device.

20 Claims, 7 Drawing Sheets

NAVIGATION SYSTEM WITH PHYSICAL ACTIVITY SAFETY MECHANISM AND METHOD OF OPERATION THEREOF

TECHNICAL FIELD

The present invention relates generally to a navigation system, and more particularly to a system for physical activity safety mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to safely navigate route users to a desired event or activity.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, navigation systems lack safety features for activities involving physical exertion such as location-based games, sports, and dances. These activities place participants and spectators in danger of serious injury and sometimes death.

Thus, a need still remains for a navigation system with physical activity safety mechanism providing low cost, improved functionality, and improved reliability. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: monitoring a participant's movement, the participant's movement is movement to a sequence of locations; identifying a movement area based on the participant's movement in a physical activity; generating a safety zone encompassing the movement area; monitoring an intrusion into the safety zone; and generating a notification of a dangerous situation based on the intrusion for displaying on a device.

The present invention provides a navigation system, including: a participant module for monitoring a participant's movement, the participant's movement is movement to a sequence of locations; a record module, coupled to the participant module, for identifying a movement area based on the participant's movement in a physical activity; a zone module, coupled to the record module, for generating a safety zone encompassing the movement area; a monitor module, coupled to the zone module, for monitoring an intrusion into the safety zone; and a notification module, coupled to the monitor module, for generating a notification of a dangerous situation based on the intrusion for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
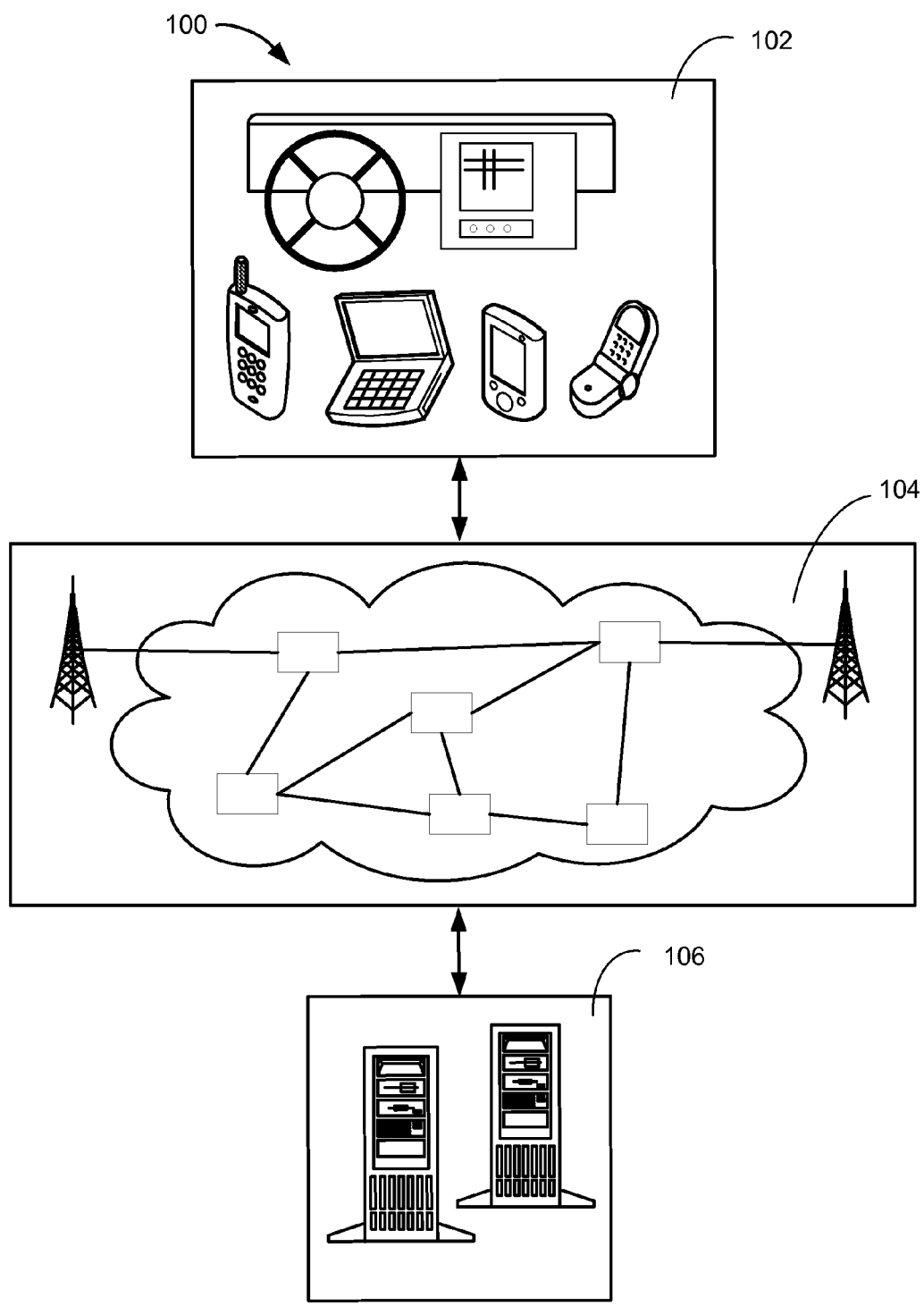
FIG. 1 is a navigation system with physical activity safety mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "geofence" referred to herein can include a virtual perimeter for a real-world geographic area with a predefined set of boundaries. A geofence can be dynamically generated as a radius around a store or a point location. Location-aware devices can enter and exit a geo-fence and notifications can be generated regarding the entry and exit.

The term "location-based game" referred to herein can include a game that evolves and progresses via a player's location and commonly supports localization technology such as satellite positioning. Location-based games can be also known as "urban gaming" and can include location-based tag, hide and go seek, and treasure hunt games.

The term "participant" referred to herein can include a participating member, player or contestant in an activity such as a location-based game, a sport, or a dance. The term "spectator" referred to herein can include an observer or a person who watches the activity or event but does not participate in the event.

Referring now to FIG. 1, therein is shown a navigation system 100 with physical activity safety mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave participation (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
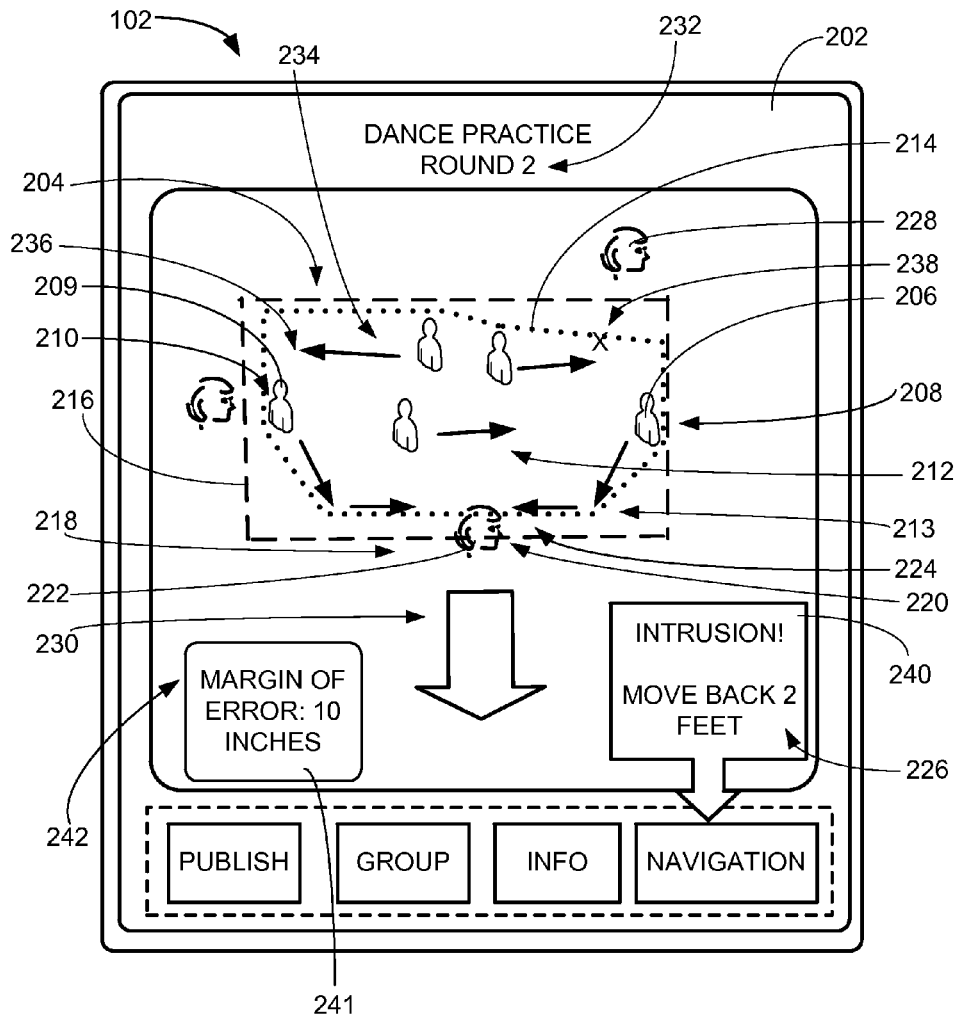
FIG. 2 is a first example of a display interface of the first device.

Referring now to FIG. 2, therein is shown a first example of a display interface 202 of the first device 102. The display interface 202 depicts five participants engaged in a physical activity such as a dance practice. The display interface 202 also depicts three spectators watching the dance practice.

The participants and spectators can be equipped with sensors such as a global positioning system (GPS) and radio frequency identification tags (RFID). For example, participants and spectators can be equipped with a sensor wristband or tag. Further for example, the participants and the spectators can each be equipped with the first device 102 that is equipped with GPS, RFID, accelerometers, Bluetooth™ sensors, infrared sensors, sonic sensors or a combination thereof.

A physical activity 204 is defined as a game, sport, competition, practice, or meeting involving one or more people. For example, the physical activity 204 can be a dance practice or a routine of a high school dance team or marching band. Further, for example, the physical activity 204 can be a limited-contact sport such as ultimate Frisbee™, soccer, field hockey, and the playground game of tag.

The physical activity 204 can also include location-based games including location-based tag, hide and go seek, and treasure hunt games as examples. The display interface 202 depicts the physical activity 204 occurring at a park. The physical activity 204 can take place indoors or outdoors such as an open field, a dance studio, a gymnasium, a football field, or a warehouse.

The physical activity 204 can have a duration or time limit. For example, if the physical activity 204 is a sport or game, the physical activity 204 can have a time limit with an elapsed time that can be tracked. The physical activity 204 can be paused for time-outs for games and sports. If the physical activity 204 is a dance performance or routine, the duration of the physical activity 204 can be associated with music. The physical activity 204 can be paused and resumed by pausing and resuming the music associated with the physical activity 204.

A first participant 206 is defined as a participating member, player or contestant in the physical activity 204. The first participant 206 can have a first participant location 208. The first participant location 208 is defined as the geographic location of the first participant 206.

A second participant 209 is defined as a second participating member, player or contestant in the physical activity 204. The second participant 209 can include a second participant location 210. The second participant location 210 is defined as the geographic location of the second participant 209.

The navigation system 100 can monitor multiple participants and for illustrative purposes, the navigation system 100 can monitor a third participant, a fourth participant, and so forth. Participants can be equipped with sensors or can be equipped with the first device 102 for using GPS and cellular triangulation to locate the participant's location. For example, the first participant 206 can be equipped with the first device 102 for locating the first participant location 208.

A participant's movement 212 is defined as the participant's travel to different positions or locations during the physical activity 204. The participant's movement 212 can include a sequence 213 of locations as the participant moves from a location to another location. The sequence 213 is defined as a continuous series. For example, the participant's movement 212 can be the sequence 213 of the first participant location 208 that are traveled to by the first participant 206 during a game.

Further, for example, the participant's movement 212 can represent dance steps, marching band field positions, or a basketball player's travel path during the physical activity 204. For example, the navigation system 100 can monitor the trajectory or path of a participant to monitor the participant's movement 212. A member of a school marching band can be equipped with the navigation system 100 and move to different locations on the field during a field show performance. The navigation system 100 can monitor and record the sequence 213 of the marching band member's travel to different locations.

A movement area 214 is defined as the geographic area that was occupied or traversed by a participant during the participant's movement 212 during the physical activity 204. For example, if the physical activity 204 is a dance performance, the geographic area occupied by the dancers during the performance is the movement area 214. If a participant runs around in a circle, the circle that was outlined by the participant's movement 212 and the area occupied by the participant can be the movement area 214.

A safety zone 216 is defined as a geofence for providing safety and protection for the participants and spectators of the physical activity 204. For example, the navigation system 100 can identify when a spectator wanders into the safety zone 216 and the navigation system 100 can generate a warning of the danger. Spectators who walk into the safety zone 216 pose the risk of colliding with the participants during the physical activity 204.

For example, if the physical activity 204 is a dance practice, a participant can trip over or collide with the spectator inside the safety zone 216. The navigation system 100 can also monitor the locations of participants and spectators to identify if a spectator has crossed into the safety zone 216.

The safety zone 216 can be generated to encompass the movement area 214. For example, a first participant 206 can perform a dance routine for the first time. The navigation system 100 can identify the movement area 214 and generate the safety zone 216 to encompass the movement area 214. The safety zone 216 can protect the first participant 206 in subsequent practices of the dance routine.

The safety zone 216, the participant's movement 212, and the movement area 214 can also be used to determine the boundaries for the physical activity 204 such as a location-based game or sport. For example, a participant can set the boundaries for a playground game of tag by walking in a loop around a park. The navigation system 100 can monitor the participant's movement 212 around the park and identify the movement area 214 as the loop. The safety zone 216 can be generated to cover the loop created by the participant's movement 212.

Further for example, the safety zone 216 can be modified to cover a larger or smaller area than the movement area 214. For example, the safety zone 216 can be generated to be larger than the movement area 214 to create a buffer area between where spectators can observe the physical activity and where participants move within the safety zone 216. The safety zone 216 can be modified to be smaller than the movement area 214 to exclude areas.

A dangerous situation 218 is defined as a situation where a participant or a spectator can become injured by colliding with another object or person. For example, the display interface 202 depicts a spectator crossing into the safety zone 216. The spectator has caused the dangerous situation 218 because the first participant 206 can collide with the spectator during a dance practice. The dangerous situation 218 can include an intrusion 220 into the safety zone 216 and a potential collision 224.

The intrusion 220 is defined as a situation where a person or object enters into the safety zone 216. The intrusion 220 can include a person, an animal, or a non-living object such as a football that enters into the safety zone 216. The intrusion 220 can include a spectator's trespass 222. The spectator's trespass 222 is defined as the situation when a spectator enters into the safety zone 216.

The potential collision 224 is defined as a situation where a participant or a spectator can collide with another object or each other. The potential collision 224 can include participants colliding with each other, participants colliding with spectators, and participants colliding with other objects such as trees or tripping over rocks. The navigation system 100 can also identify the potential collisions 224 as the dangerous situation 218.

A route 226 is defined as a course or navigation instruction from one location to another location. The route 226 can be navigation instructions for short distances or long distances. For example, the route 226 can be to "move backwards five feet" for a spectator to move out of the safety zone 216. The route 226 can also be navigation instructions from one location to another destination across a city.

A spectator location 228 is defined as the location of the spectator. The spectator location 228 can be used to generate the route 226 for the spectator. For example, the navigation system 100 can generate the route 226 from the spectator location 228 to the safety zone 216 for the spectator to watch the physical activity 204. The spectator location 228 can also be used to generate the route 226 to exit the safety zone 216 if the spectator walks into the safety zone 216 after the spectator's trespass 222.

An elimination 230 is defined as a situation when the dangerous situation 218 no longer exists within the safety zone 216. For example, the navigation system 100 can identify when a spectator has left the safety zone 216 after the spectator's trespass 222. If the dangerous situation 218 no longer exists, the navigation system 100 can identify the elimination 230 of the dangerous situation 218.

A performance round 232 is defined as a round, turn, instance, or run through of the physical activity 204. For example, if the physical activity 204 is a dance practice, the performance round 232 can be a practice round or run through of the dance routine. If the physical activity 204 is a game, the performance round 232 can be a game round, turn, or match of the game.

A practice template 234 is defined as a recording of the performance round 232 that can be used as a guide for subsequent performances of the physical activity 204. For example, the practice template 234 can be a recorded dance or recorded performance. The practice template 234 can include instructions to move to locations at specific times. Participants can use the practice template 234 to learn new dance routines, improve accuracy in performances, or improve the precision of group formations.

The navigation system 100 can generate the practice template 234 by recording the participant's movement 212 during a performance. The navigation system 100 can record performances and a participant can select between performances to assign a recorded performance as the practice template 234. For example, a participant can select a performance with no mistakes as the practice template 234. The navigation system 100 can also be used to choreograph dance routines with a series of specific locations assigned to each of the participants.

Further, for example, the practice template 234 can be a recording of a performance of a choreographed dance routine. The practice template 234 can later be viewed on the display interface 202 and mimicked for improving subsequent performances. The practice template 234 can also consist of instructions to make a series of movements to different locations.

A template location 236 is defined as a choreographed location. A series of the template location 236 can make up the practice template 234. For example, a participant can learn the practice template 234 by moving to each of the template location 236 that are choreographed in the practice template 234.

A location deviation 238 is defined as a situation when the participant's location during the performance round 232 is different from the template location 236. For example, the location deviation 238 can be a mistake made by the participant as the participant follows the practice template 234. During the performance round 232, the first participant 206 can be in a different location than the template location 236. In this situation, the first participant 206 has failed to follow the choreography because the first participant 206 is not the same as the template location 236. The navigation system 100 can monitor the participant's movement 212 to identify the location deviation 238.

A notification 240 is defined as a message communicated to participants, spectators, or a combination thereof. The notification 240 can be visual, audio, or a combination thereof. The notification 240 can be displayed to participants and spectators with information including the dangerous situation 218, the intrusion 220, the spectator's trespass 222, the potential collision 224, the elimination 230, and other information related to the physical activity 204.

The notification 240 can be a message in text. For example, the notification 240 in text format can be sent to a spectator to not create an audio distraction to participants during a dance routine. The notification 240 can also be an audio warning. For example, the notification 240 can be a beeping alarm if the navigation system 100 identifies the potential collision 224 between two participants during a game. A second notification 241 is defined as a second message communicated to participants, spectators, or a combination thereof The second notification 241 is described similarly to the notification 240.

A margin of error 242 is defined as a permissible or acceptable deviation from the target or a specific value. The margin of error 242 can be in distance units and can apply to the identification of the location deviation 238. For example, the margin of error 242 can be two inches. If the first participant 206 moves to a location that is one inch away from the template location 236, the navigation system 100 will not identify the location deviation 238.

Figure 3:
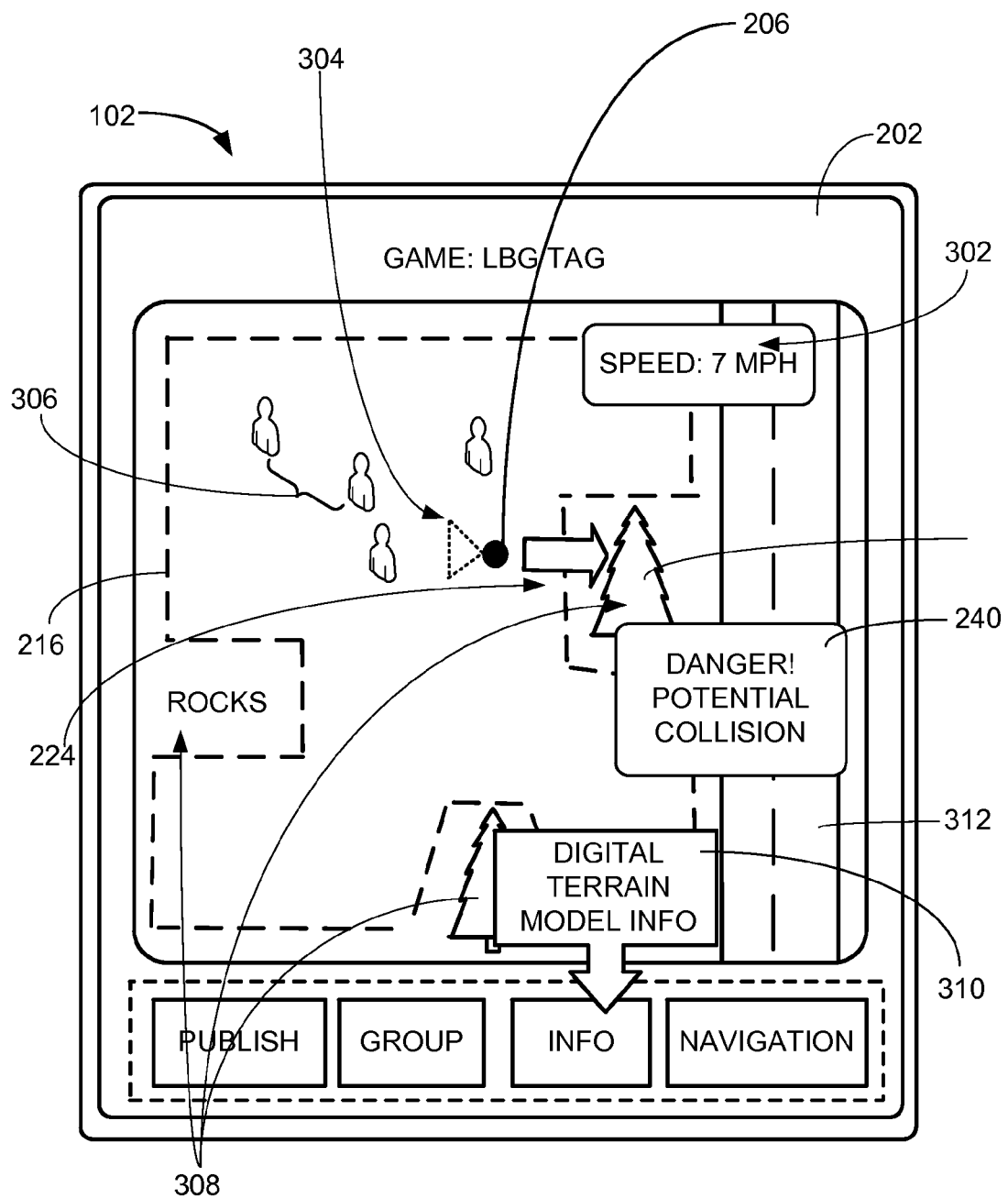
FIG. 3 is a second example of the display interface.

Referring now to FIG. 3, therein is shown a second example of the display interface 202. The display interface 202 depicts a group of participants that are playing a location-based game, such as a game of tag in a park. The display interface 202 depicts the first participant 206 being chased by the other participants. The display interface 202 also depicts a rocky location, two trees in the park, and a road 312 adjacent to the park.

A travel speed 302 is defined as the speed that a person is moving. For example, the navigation system 100 can identify the speed of a participant or a spectator if the person is equipped with sensors in the first device 102.

A vision field 304 is defined as the field of vision for a person. For example, the vision field 304 can be used to determine the direction that the first participant 206 is looking The vision field 304 can be determined by sensors to determine the direction that the first participant 206 is facing. For example, the first participant 206 can be equipped with an earpiece or headband with sensors that can indicate the orientation of a person's head.

The vision field 304 can aid the navigation system 100 in determining the potential collision 224. A participant can be running forward while their head is looking backwards. For example, the vision field 304 of the first participant 206 of FIG. 3 is directed at his pursuers but the first participant 206 can be running towards the tree that is depicted in FIG. 3. The navigation system 100 can generate the notification 240 of the potential collision 224 because the first participant 206 is looking backwards and running towards a tree.

A proximity 306 is defined as the spatial relation or distance between two locations or objects. The navigation system 100 can use the proximity 306 between objects for identifying the potential collision 224 and for generating the notification 240. The proximity 306 will be explained in greater detail below.

An obstacle 308 is defined as a physical object or condition that can block or hinder a person's movement. For example, the obstacle 308 can include: trees, large rocks, holes in the ground, and other impediments that can cause injury to the participants or spectators during the physical activity 204. The obstacle 308 can also include other participants and spectators that can collide with each other during the physical activity 204. The display interface 202 depicts the obstacle 308 as the rocky area and the trees.

The navigation system 100 can modify the safety zone 216 to exclude the obstacle 308. For example, a participant can designate the safety zone 216 to cover a park for a location-based game. The navigation system 100 can identify the obstacle 308 within the park. The display interface 202 depicts the rocky area and the trees as examples of the obstacle 308.

The display interface 202 depicts the safety zone 216 that excludes the trees and rocks within the park. If a participant crosses the safety zone 216 into the rocky area, into the road 312, or near the trees, the navigation system 100 can generate the notification 240 of the dangerous situation 218 of FIG. 2. The location-based game can be paused until all participants move away from objects that may cause the dangerous situation 218. The location-based game can be resumed once all participants are inside the safety zone 216.

A digital terrain model 310 is defined a digital representation of ground surface topography or terrain that is created for mapping out geographic areas. Digital terrain modeling includes terrain height maps, and other geographic information such as terrain roughness. Digital terrain models can be prepared using direct land surveying or through using radar for a designated geographic area. The navigation system 100 can use the digital terrain model 310 to detect and identify the obstacle 308 near the movement area 214 of FIG. 2.

For example, the navigation system 100 can use pre-generated versions of the digital terrain model 310 to detect and identify pits, wells, rough terrain and other geographic hazards in an outside area that will be used for the physical activity 204. If a pre-generated version of the digital terrain model 310 is not available for a geographic area, the navigation system 100 can generate the digital terrain model 310. The digital terrain model 310 will be explained in further detail below.

Figure 4:
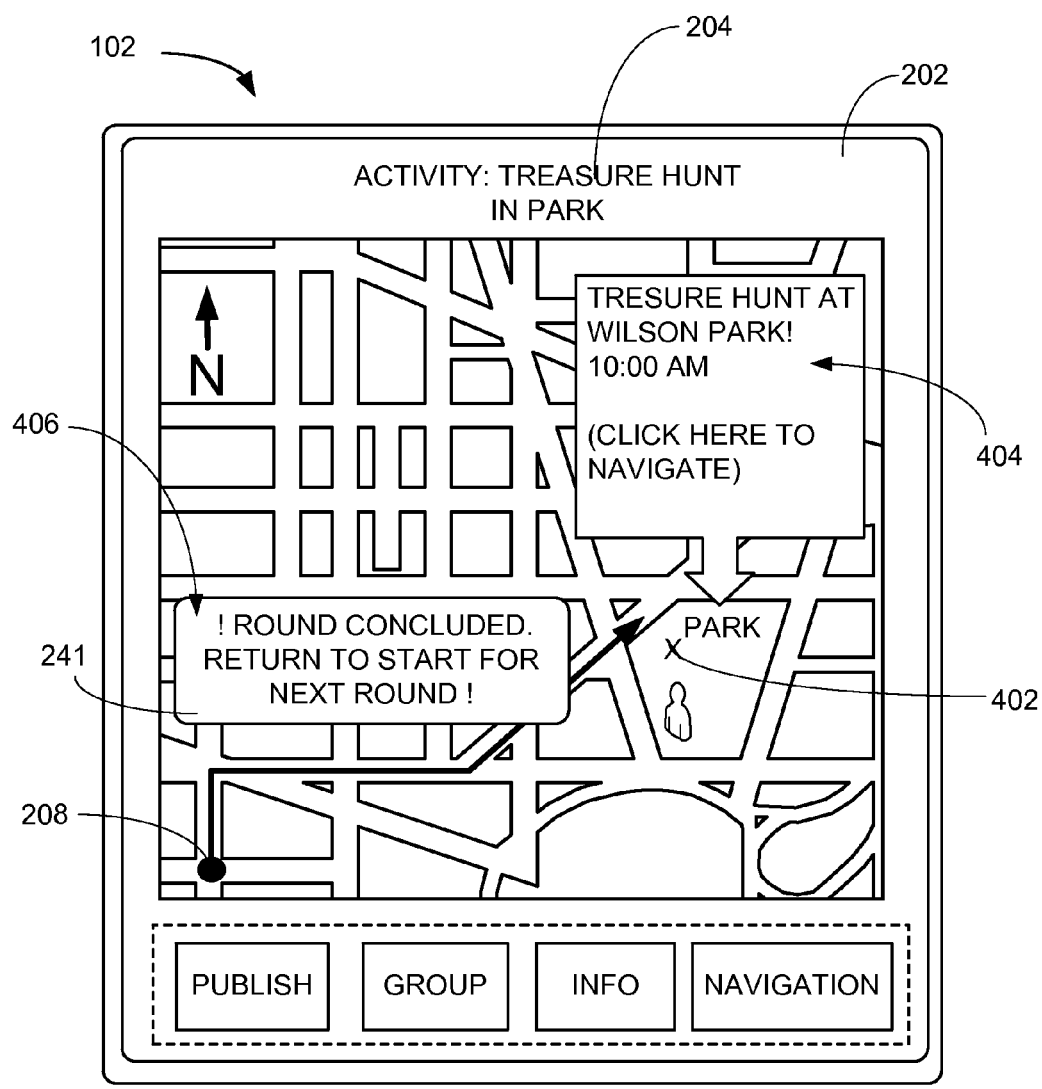
FIG. 4 is a third display example of the display interface.

Referring now to FIG. 4, therein is shown a third example of the display interface 202. The display interface 202 depicts a map of a part of a city. The display interface 202 also depicts the route 226 from the first participant location 208 to an event location 402.

The event location 402 is defined as a starting location, meeting place, or rally point for the physical activity 204. For example, participants can navigate to the event location 402 to begin the physical activity 204 such as a dance practice or a location-based game.

An event announcement 404 is defined as news or background information about the physical activity 204. The event announcement 404 can include the name of the event, the start time of the event, the address of the event, and event information such as game rules for the physical activity 204. The event announcement 404 can be published to participants and spectators to help organize performances, practices, games, and sports.

A conclusion 406 is defined as the termination or end of the performance round 232 of FIG. 2. The display interface 202 depicts the conclusion 406 as the end of the performance round 232 for a treasure hunt game. The conclusion 406 of the performance round 232 can be published in the second notification 241 to participants and spectators. For example, the second notification 241 of the conclusion 406 of the performance round 232 can inform participants to return to the event location 402 to begin the next round of the game.

Figure 5:
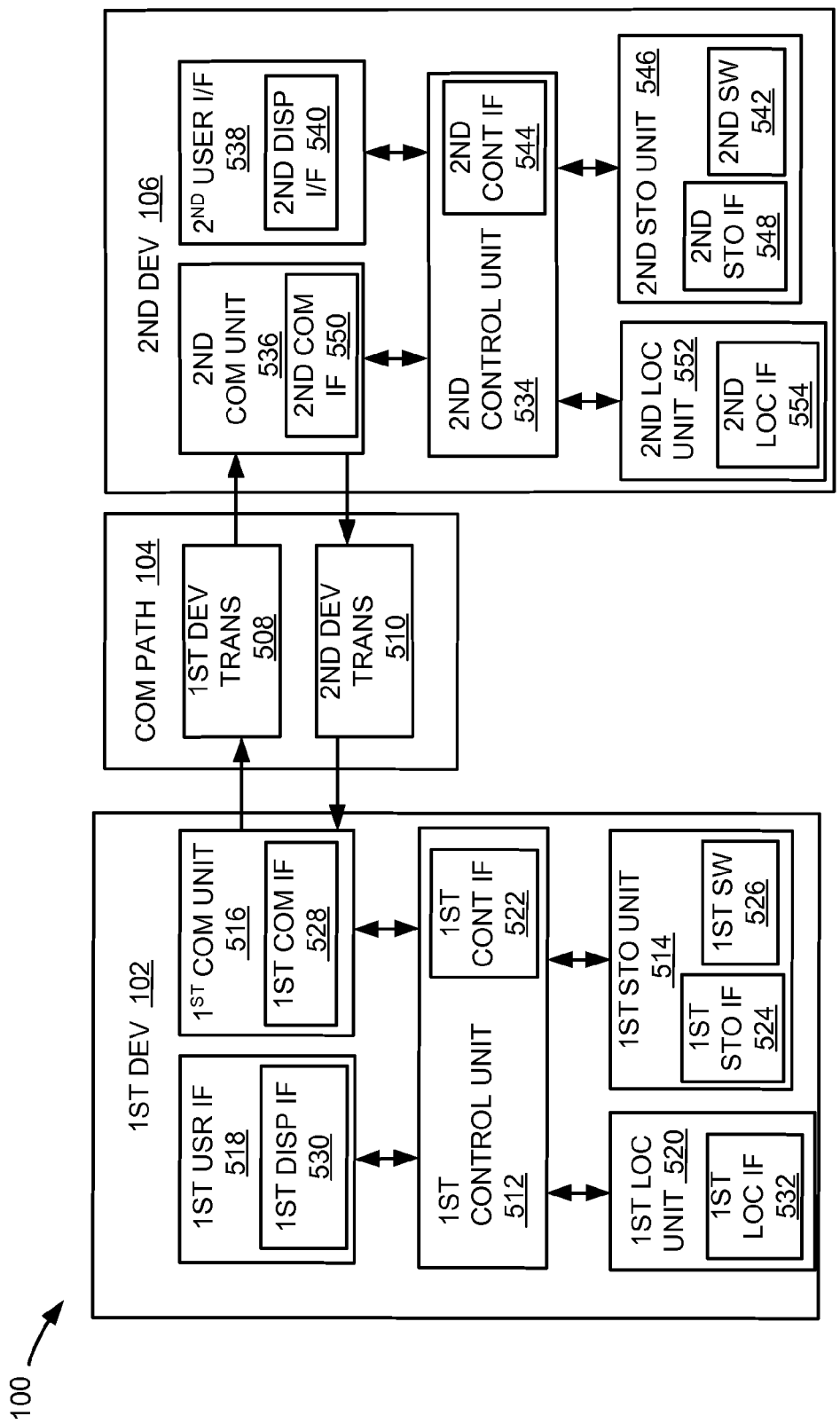
FIG. 5 is an exemplary block diagram of the navigation system.

Referring now to FIG. 5, therein is shown an exemplary block diagram of the navigation system 100. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a first location unit 520. The first device 102 of FIG. 5 can be similarly described by the first device 102 of FIG. 1.

The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first location unit 520 can generate location information, current heading, and current speed of the first device 102, as examples. The first location unit 520 can be implemented in many ways. For example, the first location unit 520 can function as at least a part of a global positioning system (GPS), an inertial navigation system, a cellular-tower location system, a pressure location system, or any combination thereof.

The first location unit 520 can include a first location interface 532. The first location interface 532 can be used for communication between the first location unit 520 and other functional units in the first device 102. The first location interface 532 can also be used for communication that is external to the first device 102.

The first location interface 532 can receive information from the other functional units or from external sources, or can transmit information to the other functional units or to external destinations. The external sources and the external destinations refer to sources and destinations external to the first device 102.

The first location interface 532 can include different implementations depending on which functional units or external units are being interfaced with the first location unit 520. The first location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the first location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. Examples of the first display interface 530 can include the display interface 202 of FIG. 2. The first display interface 530 can include a display, a projector, a video screen, a speaker, or any combination thereof. The screenshot shown on the display interface 202 described in FIG. 2 can represent an example of a screenshot for the navigation system 100.

The first control unit 512 can operate the first user interface 518 to display information generated by the navigation system 100. The first control unit 512 can also execute the first software 526 for the other functions of the navigation system 100, including receiving location information from the first location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, a second user interface 538, and a second location unit 552.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the first location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

The second location unit 552 can receive location information, current heading, and current speed of the first device 102, as examples. The second location unit 552 can be implemented in many ways. For example, the second location unit 552 can function as at least a part of a global positioning system (GPS), an inertial navigation system, a cellular-tower location system, a pressure location system, or any combination thereof.

The second location unit 552 can include a second location interface 554. The second location interface 554 can be used for communication between the second location unit 552 and other functional units in the first device 102. The second location interface 554 can also be used for communication that is external to the second device 106.

The second location interface 554 can receive information from the other functional units or from external sources, or can transmit information to the other functional units or to external destinations. The external sources and the external destinations refer to sources and destinations external to the second device 106.

The second location interface 554 can include different implementations depending on which functional units or external units are being interfaced with the second location unit 552. The second location interface 554 can be implemented with technologies and techniques similar to the implementation of the second controller interface 544.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the first location unit 520, although it is understood that the second device 106 can also operate the first location unit 520.

Figure 6:
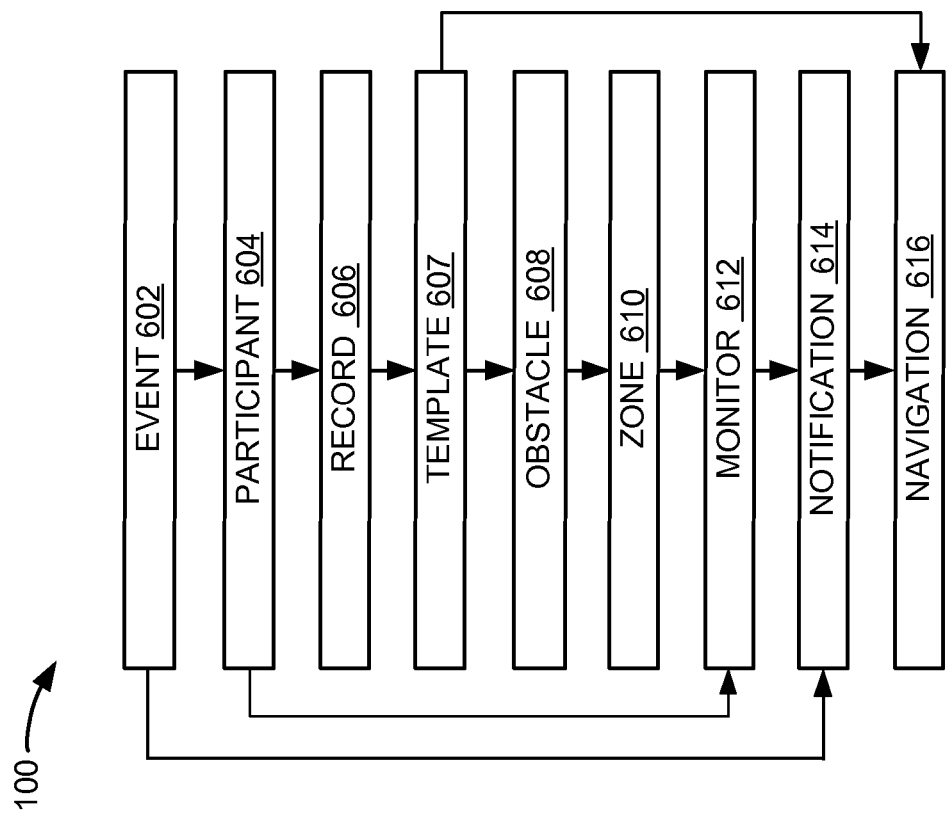
FIG. 6 is a control flow of the navigation system.

Referring now to FIG. 6, therein is shown a control flow of the navigation system 100. The navigation system 100 can include an event module 602, a participant module 604, a record module 606, a template module 607, an obstacle module 608, a zone module 610, a monitor module 612, a notification module 614, and a navigation module 616. In the navigation system 100, as an example, each module is indicated by a number and successively higher module numbers follow one another. Control flow can pass from one module to the next higher numbered module unless explicitly otherwise indicated.

The event module 602 receives the event announcement 404 of FIG. 4 for the physical activity 204 of FIG. 2 and the event module 602 receives the margin of error 242 of FIG. 2 for the location deviation 238 of FIG. 2. For example, the event module 602 can receive the name of the event, the type of the physical activity 204 of FIG. 2, and the event location 402 of FIG. 4. If the physical activity 204 is a location-based game, the event module 602 can receive the rules and conditions of the physical activity 204 such as the time limit for the game. The event module 602 can also receive the event announcement 404 through user input. The event module 602 can also be coupled to the notification module 614 for publishing the event announcement 404 to participants and spectators.

The event module 602 also receives the margin of error 242. The event module 602 can receive the margin of error 242 through the event announcement 404. For example, the event announcement 404 can include information that the physical activity 204 will be a novice group that is learning a dance routine for the first time. The event module 602 can receive a large distance as the margin of error 242 or the event module 602 can set the margin of error 242 to a large distance.

Further, for example, if the event announcement 404 includes information that the physical activity 204 will include an intermediate group of participants that want to improve precision in a dance routine, the event module 602 can set the margin of error 242 to be a shorter distance. For example, the margin of error 242 can be set to five inches for the first round of the performance round 232 of FIG. 2. Subsequent rounds of the performance round 232 can have the margin of error 242 deduced by one inch.

The participant module 604 monitors the participant's movement 212 of FIG. 2 and locates the first participant location 208 and the second participant location 210 of FIG. 2. The participant module 604 can monitor and locate the first participant location 208 if the participant is equipped with a tracking device such as the first device 102 of FIG. 1. For example, the participant module 604 can locate the first participant location 208 using sensors such as GPS, cellular triangulation, radio frequency identifying tags, Bluetooth™ technology, or a combination thereof.

Further, for example, the participant module 604 monitors the first participant 206 of FIG. 2 as the first participant 206 moves from location to location. The participant module 604 can monitor the sequence 213 of FIG. 2 of the first participant location 208 during the physical activity 204. The participant module 604 can also be coupled to the monitor module 612 for monitoring the participant's movement 212 in relation to the safety zone 216 of FIG. 2. The monitor module 612 will be explained in further detail below.

The record module 606 identifies the movement area 214 of FIG. 2 and the record module 606 generates the practice template 234 of FIG. 2. The record module 606 identifies the movement area 214 by recording the locations traveled to during the participant's movement 212. For example, the record module 606 can record the geographic areas that were occupied by the first participant 206 and the record module 606 identifies the occupied areas or locations as the movement area 214. The navigation system 100 can use the movement area 214 for generating the safety zone 216.

For illustrative purposes, the first participant 206 can demarcate the safety zone 216 by running around in a circle. The record module 606 can identify the area that was occupied during the participant's movement 212 of the first participant 206 as the movement area 214. The navigation system 100 can generate the safety zone 216 to encompass the area that was defined by the circle. Spectators can avoid the safety zone 216 to avoid interfering with the physical activity 204 that can take place inside the safety zone 216.

Further for example, the record module 606 can receive user input to select the geographic area that the safety zone 216 can cover. The record module 606 can be coupled to the display interface 202 and the first user interface 518 of FIG. 5 for receiving user input.

The record module 606 can also generate the practice template 234 by recording the participant's movement 212. For example, the record module 606 can record the participant's movement 212 during a dance routine as the practice template 234. The navigation system 100 can save and delete the practice templates 234 that are recorded. The practice templates 234 can be used to practice performances and dance routines.

The template module 607 identifies the template location 236 of FIG. 2 by overlaying the practice template 234 over a geographic area to find locations that mirror the participant's movement 212 in the practice template 234. For example, the template module 607 can apply the practice template 234 to any location such as a dance studio or park. The template module 607 can identify specific geographic coordinates as the template location 236.

For illustrative purposes, the physical activity 204 can be a marching band field show that requires many participants to be in formation. The marching band field show can be recorded at an earlier time or the routine can be choreographed using a computer. Each member of the marching band can use the practice template 234 to travel to the template location 236 that is assigned to them at specific music cues. Participants can travel directly to the template location 236 to learn the choreographed routine. Band members can learn routines and formations quickly by using the navigation system 100 to find their assigned positions.

The obstacle module 608 can detect and identify the obstacle 308 of FIG. 3. The obstacle module 608 can detect and identify the obstacle 308 in the area through various methods. For example, the obstacle module 608 can access online databases that include the digital terrain model 310 of FIG. 3 to detect and identify the obstacle 308.

The digital terrain model 310 can include direct land surveying information of geographic areas such as open fields and parks for use in location-based games. The digital terrain model 310 can include the locations of the rocky area and the trees of the park that is depicted in FIG. 3. The obstacle module 608 can use the digital terrain model 310 to identify the rocky area and the tress for displaying on the display interface 202 and for modifying the safety zone 216.

If a pre-generated model of the digital terrain model 310 for the area is not available, the obstacle module 608 can generate the digital terrain model 310 for the area. The obstacle module 608 can detect and identify the obstacle 308 by using sensor technologies equipped on the first device 102. The first device 102 can be equipped with technologies such as Radar, LIDAR, Sonar, Bluetooth™, IR, or a combination thereof to generate the digital terrain model 310.

For example, participants can place the first device 102 on the ground and the first device 102 can use the technologies listed above to scan for the obstacle 308. The navigation system 100 can scan in three hundred and sixty degrees around the first device 102. The obstacles 308 that are detected in the scan can be used to generate the digital terrain model 310.

Further for example, the participant can point the first device 102 toward a geographic area to scan for the obstacle 308 in that direction. The first participant 206 can stand at one corner of a park and point the first device 102 toward the direction where the physical activity 204 will take place. For example, the obstacle module 608 can use lasers and LIDAR to detect differences in terrain height. The obstacle module 608 can use radar to detect and identify objects such as trees using active and passive radar.

The zone module 610 generates and modifies the safety zone 216 of FIG. 2. The zone module 610 can generate the safety zone 216 to encompass the movement area 214 and modify the safety zone 216 to exclude the obstacle 308. The zone module 610 generates the safety zone 216 by designating a geofence around the movement area 214.

The zone module 610 can also use the digital terrain model 310 or information from the obstacle module 608 to modify the safety zone 216. For example, the digital terrain model 310 can include the locations of the rocky area and the trees that are depicted on the display interface 202 of FIG. 3. The zone module 610 can identify the locations of the obstacle 308 using the digital terrain model 310 and the zone module 610 can modify the safety zone 216 to exclude the obstacles 308. The zone module 610 can modify the safety zone 216 by changing the shape of the safety zone 216.

The zone module 610 can also modify the safety zone 216 to create a buffer area between the safety zone 216 and the movement area 214. The zone module 610 can increase the size of the safety zone 216 beyond the area of the movement area 214. The area for the buffer can give participants extra space away from spectators. For example, the physical activity 204 can be a dance routine that includes kicks and acrobatics. The buffer area between the safety zone 216 and the movement area 214 can protect participants from striking spectators.

The monitor module 612 monitors activities within the safety zone 216 including monitoring for the occurrence of the dangerous situation 218 of FIG. 2. For example, the monitor module 612 can monitor for the occurrence of the intrusion 220, the spectator's trespass 222, the potential collision 224, and the elimination 230 of FIG. 2 of the dangerous situation 218. The monitor module 612 also pauses and resumes the physical activity 204 if the monitor module 612 identifies the dangerous situation 218.

The monitor module 612 also identifies if participants exit the safety zone 216 which can also cause the dangerous situation 218. For example, the first participant 206 that is depicted in FIG. 3 can exit the safety zone 216 and collide with the obstacle 308 of FIG. 3. The first participant 206 can also exit the safety zone 216 and run into the road 312 of FIG. 3. The safety zone 216 can be generated to exclude the road 312 to prevent participants from being hit by cars. The monitor module 612 will be explained in further detail below.

The notification module 614 generates the notification 240 of FIG. 2 and the second notification 241 of FIG. 2. The notification module 614 can generate the notification 240 and the second notification 241 with information about the intrusion 220, the spectator's trespass 222, the elimination 230, the potential collision 224, the dangerous situation 218, the event announcement 404 of FIG. 4, and the conclusion 406 of FIG. 4. The notification 240 and the second notification 241 can be similarly described.

The notification module 614 can generate the notification 240 and the second notification 241 as an audio alert. Different alert sounds can warn of different dangerous. For example, the notification module 614 can generate a rapid beeping sound to warn a participant that they may collide with the obstacle 308. A participant that is being chased can hear the warning and stop to avoid a possible injury.

The notification module 614 can also generate the notification 240 and the second notification 241 in text. For example, the notification module 614 can generate the notification 240 of the conclusion 406 of the performance round 232 for all participants to return to the event location 402. Further, for example, the notification module 614 can generate the notification 240 to a spectator without creating a sound that may disturb the physical activity 204.

The navigation module 616 generates the route 226 of FIG. 2 for providing navigation instructions to participants and spectators. The navigation module 616 can generate the route 226 for participants and spectators to navigate to the event location 402 of the physical activity 204. The navigation module 616 can also generate the route 226 for the spectators to navigate to the edge of the safety zone 216. From this position, a spectator can observe the physical activity 204 without creating the dangerous situation 218 for the participants inside the safety zone 216.

The physical transformation from recording the participant's movement 212, identifying the movement area 214, and generating the safety zone 216 result in movement in the physical world, such as people using the first device 102 based on the operation of the navigation system 100. As the movement in the physical world occurs, the movement itself creates additional information that is converted back to the safety zone 216 and the notification 240 for the continued operation of the navigation system 100 and to continue the movement in the physical world.

The modules of the navigation system 100 can be implemented on the first device 102 of FIG. 5, on the second device 106 of FIG. 6, or partitioned between the first device 102 and the second device 106. The first software 526 of FIG. 5 of the first device 102 of FIG. 5 can include the navigation system 100. For example, the first software 526 can include the event module 602, the participant module 604, the record module 606, the template module 607, the obstacle module 608, the zone module 610, the monitor module 612, the notification module 614, and the navigation module 616. The first control unit 512 of FIG. 5 can execute the first software 526.

The first control unit 512 can execute the event module 602 to receive the event announcement 404. The first control unit 512 can execute the participant module 604 to monitor the participant's movement 212. The first control unit 512 can also execute the participant module 604 to locate the first participant location 208 and the second participant location 210.

The first control unit 512 can execute the record module 606 to identify the movement area 214. The first control unit 512 can also execute the record module 606 to generate the practice template 234.

The first control unit 512 can execute the obstacle module 608 to detect and identify the obstacle 308. The first control unit 512 can execute the zone module 610 to generate and modify the safety zone 216. The first control unit 512 can execute the monitor module 612 to monitor the safety zone 216.

The first control unit 512 can execute the notification module 614 to generate the notification 240. The first control unit 512 can execute the navigation module 616 to generate the route 226 to destinations. The first communication unit 516 can be used by the event module 602, the monitor module 612, and the notification module 614 to send and receive information.

The participant module 604 and the monitor module 612 can use the first location unit 520 of FIG. 5 to locate the first participant location 208, the second participant location 210, and the spectator location 228. The first display interface 530 of FIG. 5 can display the event announcement 404 and the route 226.

In an example for the second device 106 of FIG. 5, the second software 542 of FIG. 5 can include the navigation system 100. For example, the second software 542 can include the event module 602, the participant module 604, the record module 606, the template module 607, the obstacle module 608, the zone module 610, the monitor module 612, the notification module 614, and the navigation module 616. The second control unit 534 of FIG. 5 can execute the second software 542.

The second control unit 534 can execute the event module 602 to receive the event announcement 404. The second control unit 534 can execute the participant module 604 to monitor the participant's movement 212. The second control unit 534 can also execute the participant module 604 to locate the first participant location 208 and the second participant location 210.

The second control unit 534 can execute the record module 606 to identify the movement area 214. The second control unit 534 can also execute the record module 606 to generate the practice template 234.

The second control unit 534 can execute the obstacle module 608 to detect and identify the obstacle 308. The second control unit 534 can execute the zone module 610 to generate and modify the safety zone 216. The second control unit 534 can execute the monitor module 612 to monitor the safety zone 216.

The participant module 604 and the monitor module 612 can use the second location unit 552 of FIG. 5 to locate the first participant location 208, the second participant location 210, and the spectator location 228. The second display interface 540 of FIG. 5 can display the event announcement 404 and the route 226.

In another example, the navigation system 100 can be partitioned between the first software 526 and the second software 542. For example, the first software 526 can include the navigation module 616. The second software 542 can include the event module 602, the participant module 604, the record module 606, the obstacle module 608, the zone module 610, the monitor module 612, and the notification module 614.

The second control unit 534 can execute modules partitioned on the second software 542 as previously described. The second communication unit 536, the second location unit 552, and the second display interface 540 can be used by the modules partitioned on the second device 106 as previously described.

The first control unit 512 can execute the navigation module 616 as previously described. The first communication unit 516, the first location unit 520, and the first display interface 530 can be used by the modules partitioned on the second device 106 as previously described.

It has been discovered that the present invention provides the navigation system 100 for increasing safety and reducing injuries for the physical activity 204 such as location-based games, dance practices, and performances. The navigation system 100 records the participant's movement 212 during the physical activity 204 for identifying the movement area 214. The navigation system 100 uses the movement area 214 to generate the safety zone 216 encompassing the movement area 214. The safety zone 216 is generated to encompass the area of the movement area 214. The safety zone 216 increases safety because it warns participants to remain in the safety zone 216 and warns spectators to remain outside the safety zone 216.

The navigation system 100 monitors the safety zone 216 for the dangerous situation 218 that can be caused by the intrusion 220 and the spectator's trespass 222. The navigation system 100 can use radar, LIDAR, sonar, WiFi, Bluetooth™, infrared, and other sensor technologies to detect threats to participants and spectators. The navigation system 100 can generate the notification 240 to warn participants of the intrusion 220.

The navigation system 100 can generate the route 226 for spectators to move out of the safety zone 216 if the spectator's trespass 222 has occurred. The safety zone 216 can increase the safety of activities such as location-based games, dance practices, cheerleading performances, musicals sports, and other extracurricular activities.

Further, it has been discovered that the present invention provides a crowded event space saving tool for spectators to observe performances. Spectators can navigate to the outer edge of the safety zone 216 to observe the physical activity 204 without obstructing the participants' activities within the safety zone 216. For example, the safety zone 216 allows a spectator a close view of the performance creating efficient use of space in crowded dance studios or crowded areas. Spectators can be close to participants and participants can practice performances or play games without fear of colliding with other people or objects.

Further, it has been discovered that the present invention can allow the safety zone 216 to be generated based on the participant's movement 212 instead of through user input on a user interface. Participants can perform, dance, march, and run in a geographic area. The navigation system 100 can record the area that was occupied by the participant's movement 212 for generating the safety zone 216. The safety zone 216 can be modified to exclude the obstacle 308 or enlarged to create a buffer area for participants inside the safety zone 216.

Further, it has been discovered that the present invention can train participants to improve performances. For example, the navigation system 100 can record the practice template 234 as a guide for subsequent performances of the physical activity 204. Participants can follow the routing instructions to the template location 236 in the practice template 234. Participants can use the practice template 234 to learn new routines or to increase precision in their performances.

The navigation system 100 describes the module functions or order as an example. The modules can be partitioned differently. For example, the participant module 604, the record module 606, and the obstacle module 608 can be combined. Each of the modules can operate individually and independently of the other modules.

Furthermore, data generated in one module can be used by another module without being directly coupled to each other. For example, the navigation module 616 can directly receive navigation information from the event module 602.

Figure 7:
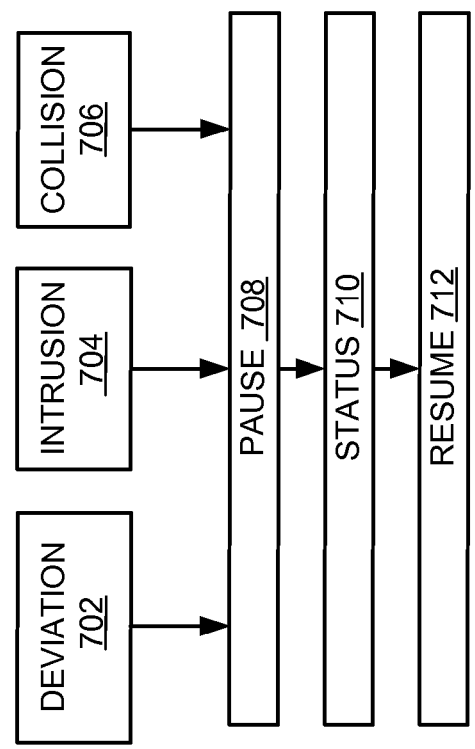
FIG. 7 is a control flow of the monitor module.

Referring now to FIG. 7, therein is shown a control flow of the monitor module 612. The monitor module 612 monitors activity within the safety zone 216 of FIG. 2 including monitoring for the location deviation 238 of FIG. 2, for the intrusion 220 of FIG. 2, and for the dangerous situation 218 of FIG. 2. The monitor module 612 also pauses the physical activity 204 of FIG. 4 if the monitor module 612 identifies the location deviation 238, for the intrusion 220, and the dangerous situation 218.

The monitor module 612 can include a deviation module 702, an intrusion module 704, a collision module 706, a pause module 708, a status module 710, and a resume module 712. In the monitor module 612, as an example, each module is indicated by a number and successively higher module numbers follow one another. Control flow can pass from one module to the next higher numbered module unless explicitly otherwise indicated.

The deviation module 702 identifies the location deviation 238 by comparing the participant's movement 212 of FIG. 2 during the performance round 232 of FIG. 2 to the practice template 234 of FIG. 2. For example, the deviation module 702 can compare the first participant location 208 of FIG. 2 to the template location 236 of FIG. 2 at a specific time or time periods. If the first participant location 208 does not match the template location 236, the deviation module 702 can identify the location deviation 238 for the first participant location 208.

For illustrative purposes, the practice template 234 can be a dance routine that is set to music. The dance routine requires the participants to dance to specific locations at specific times that correspond with the music. The participant's movement 212 during the dance routine can be the sequence 213 of FIG. 2 of movements to the first participant location 208 of the first participant 206 of FIG. 2.

For example, if the first participant 206 moves to a correct location, the deviation module 702 will not identify the location deviation 238. In this situation, the first participant location 208 will be the same as the template location 236 from the practice template 234. If the first participant 206 moves to an incorrect location, the deviation module 702 can identify the location deviation 238. The first participant location 208 will be deviated from or astray from the template location 236. The deviation module 702 can be coupled to the notification module 614 of FIG. 6 for generating the second notification 241 of FIG. 2 of the location deviation 238.

The deviation module 702 can receive user input to modify the margin of error 242 of FIG. 2. The margin of error 242 for identifying the location deviation 238 can be adjusted based on the experience level of the participant. The margin of error 242 can be very high for a participant that is learning a routine for the first time. For example, if the participant is two feet away from the template location 236, the navigation system 100 will not generate the second notification 241 of the location deviation 238.

As the participants learn and improve at the routine, the margin of error 242 can be adjusted to be smaller which requires more precision and accuracy from the participant's movement 212. For example, the margin of error 242 can be set to two inches. If the first participant location 208 is two inches off from the template location 236, the second notification 241 can be generated.

The deviation module 702 can send a request to the navigation module 616 of FIG. 6 to generate the route 226 of FIG. 2 from the first participant location 208 to the template location 236. Participants can follow the route 226 to move to the correct location from the practice template 234.

The deviation module 702 can be coupled to the pause module 708 for pausing the physical activity 204 if the location deviation 238 is identified. For example, the deviation module 702 can identify the location deviation 238 in a dance routine and the pause module 708 can pause the dance routine based on the location deviation 238. The pause feature for the location deviation 238 can be toggled on and off so that a single participant's mistake will not disturb the entire performance or practice. The pause module 708 will be explained in further detail below.

The intrusion module 704 identifies the intrusion 220 into the safety zone 216. The intrusion module 704 can also identify the spectator's trespass 222 of FIG. 2. The intrusion module 704 can identify the spectator's trespass 222 if the spectator is equipped with GPS or sensors equipped in the first device 102 of FIG. 1.

For example, the intrusion module 704 can identify the spectator location 228 of FIG. 2 in relation to the safety zone 216. If the spectator crosses into the safety zone 216, the intrusion module 704 can identify the spectator's trespass 222. The intrusion module 704 can also use radar or other sensor technologies to identify the intrusions 220.

The first device 102 can identify objects that have entered into the safety zone 216 by range finding the object using sonar, lasers, or radar. For illustrative purposes, a person that is not equipped with the navigation system 100 can walk into the safety zone 216. The intrusion module 704 can receive the location of the first device 102 to establish a point of reference for the safety zone 216. The first device 102 can use radar or any of the sensor technologies listed above to identify the location of objects near the first device 102. Using the location of the first device 102 as a reference point, the intrusion module 704 can identify if the object is inside or outside of the safety zone 216.

For example, the safety zone 216 can be a circle with a diameter of fifty meters. The location of the first device 102 can be identified through GPS as ten meters from the edge of the safety zone 216. The first device 102 can be equipped with radar that detects an object that is five meters away from the first device and in the same direction as the edge of the safety zone 216. The intrusion module 704 can analyze the locations of the first device 102 and the object for identifying that the object is five meters within the safety zone 216.

The intrusion module 704 can be coupled to the pause module 708 for pausing the physical activity 204 if the intrusion 220 is identified. For example, the intrusion module 704 can identify the spectator's trespass 222 into the safety zone 216 and the pause module 708 can pause the physical activity 204 based on the spectator's trespass 222. The pause module 708 will be explained in further detail below.

The collision module 706 identifies the potential collision 224 of FIG. 2. The collision module 706 can identify the potential collision 224 between two participants, between a participant and a spectator, between two spectators, between a participant and the obstacle 308 of FIG. 3, and between a spectator and the obstacle 308. The collision module 706 can use the locations of the participants and the spectators, the vision field 304 of FIG. 3, the travel speed 302 of FIG. 3, the proximity 306 of FIG. 3, or a combination thereof to identify the potential collision 224.

For example, the collision module 706 can use radar, sonar, or any of the sensor technologies listed above to identify the potential collision 224. For example, the collision module 706 can detect if an object is quickly traveling toward the first participant 206 using active and passive sonar.

Further, for example, the collision module 706 can identify the potential collision 224 by using the travel speed 302, the vision field 304, the proximity 306 of objects, or a combination thereof to identify the probability of the potential collision 224. The probability of the potential collision 224 can be a threshold level that can be adjusted by user input. If the potential collision 224 is identified, the navigation system 100 can generate the notification 240 of the potential collision 224.

The collision module 706 can use the travel speed 302 as one factor in identifying the potential collision 224. For example, the navigation system 100 can track the travel speed 302 of participants during a location-based game. If the first participant 206 and the second participant 209 of FIG. 2 are moving at seven miles per hour toward each other, the collision module 706 can use this factor in determining the probability of the potential collision 224. If the two participants slow down as they approach each other, the collision module 706 can determine that the potential collision 224 is unlikely to occur.

Further, for example, the collision module 706 can use the vision field 304 of participants as one factor in determining the chances of the potential collision 224. A participant or spectator can be wearing a sensor headband, glasses, or an earpiece that can indicate the vision field 304. If a person or the obstacle 308 is identified as not being within the vision field 304, the collision module 706 can determine that the participant has a higher change of colliding with the object.

Still further, for example, the collision module 706 can use the proximity 306 of participants, spectators, objects or a combination thereof as one factor in identifying the probability of the potential collision 224. The collision module 706 can receive the first participant location 208, receive the second participant location 210, and receive the location of the obstacle 308 for identifying the probability of the potential collision 224. For example, if the first participant location 208 and the second participant location 210 are close together, the navigation system 100 can identify the potential collision 224 if the first participant 206 is running toward the second participant 209.

The collision module 706 can analyze the travel speed 302, the vision field 304, the proximity 306 of objects, or a combination thereof to identify the probability of the potential collision 224. For example, if the first participant 206 is running towards the second participant 209, the travel speed 302 and the proximity 306 can trigger the generation of the notification 240 of the potential collision 224. If the vision field 304 of the first participant 206 and of the second participant 209 is direct towards each other, the collision module 706 can determine that the potential collision 224 would not occur and not trigger the notification 240. The collision module 706 can send requests for the generation of the notification 240 to the notification module 614.

The collision module 706 can be coupled to the pause module 708 for pausing the physical activity 204 if the potential collision 224 is identified. For example, the collision module 706 can identify the potential collision 224 between participants and spectators and the pause module 708 can pause the physical activity 204 based on the potential collision 224. The pause module 708 will be explained in further detail below.

The pause module 708 pauses the physical activity 204 after identifying the dangerous situation 218. For example, a group of participants can be playing a location-based game when the intrusion 220 or the potential collision 224 is identified. The pause module 708 can pause the physical activity 204 so participants can safely remove the dangerous situation 218 and resume play. The pause module 708 can also pause the physical activity 204 if the location deviation 238 is identified.

If the physical activity 204 is a game with a time limit, the pause module 708 can pause the countdown of the time limit. For illustrative purposes, the first participant 206 can run out of the safety zone 216 and into the road 312 of FIG. 3. The pause module 708 can pause the physical activity 204 for a "time-out" in the location-based game. The first participant 206 can use the "time-out" to safely reenter the safety zone 216 so the physical activity 204 can resume.

Further, for example, the navigation system 100 can pause a dance practice by pausing the music that is associated with the dance. The pause module 708 can control the playback of the music. During the pause in the music, the participants in the dance practice can eliminate the dangerous situation 218 before resuming the dance practice. The music can be reset and the participants can move to their assigned positions before resuming the practice of the dance performance.

The navigation system 100 can enable and disable the operation of the pause module 708. For example, participants can be performing a dance show in front of a live audience. If a mistake occurred during the show, the pause module 708 can be disabled so that the physical activity 204 is not paused because of the mistake. The pause module 708 can be coupled to the status module 710 for resuming the physical activity 204.

The status module 710 identifies the elimination 230 of FIG. 2 of the dangerous situation 218 and the status module 710 identifies the conclusion 406 of the performance round 232 of FIG. 2. For example, the status module 710 can identify when the spectator has exited the safety zone 216 after the spectator's trespass 222.

The status module 710 can identify if the participants are in the safety zone 216 and the status module 710 can identify if all other objects and spectators are outside the safety zone 216. The status module 710 can be coupled to the resume module 712 for resuming the physical activity 204 after the elimination 230 of the dangerous situation 218.

The status module 710 can also identify the conclusion 406 of the performance round 232. The status module 710 can monitor the time limit or music of the physical activity 204. The status module 710 can identify the conclusion 406 of the performance round 232 when the time limit lapses or the music ends. The status module 710 can also identify if participants have returned to the template location 236 after the location deviation 238 of the practice template 234. The status module 710 can be coupled to the resume module 712 for resuming the physical activity 204.

The resume module 712 resumes the physical activity 204 after the elimination 230 of the dangerous situation 218. For example, the resume module 712 can receive information from the status module 710 that the dangerous situation 218 has been removed from the safety zone 216. The resume module 712 can resume the game timer if the physical activity 204 is a game or resume the music if the physical activity 204 is a dance practice. The resume module 712 can resume the physical activity 204 if participants have returned to the template location 236 after the location deviation 238 of the practice template 234.

The physical transformation from monitoring the safety zone 216 for the potential collision 224 and the intrusion 220 results in movement in the physical world, such as people using the first device 102 based on the operation of the navigation system 100. As the movement in the physical world occurs, the movement itself creates additional information that is converted back to the physical activity 204 for the continued operation of the navigation system 100 and to continue the movement in the physical world.

The monitor module 612 can be implemented on the first device 102 of FIG. 5, on the second device 106 of FIG. 5, or partitioned between the first device 102 and the second device 106. The first software 526 of FIG. 5 of the first device 102 can include the deviation module 702, the intrusion module 704, the collision module 706, the pause module 708, the status module 710, and the resume module 712. The first control unit 512 of FIG. 5 can execute the first software 526.

The first control unit 512 can execute the deviation module 702 to monitor the performance round 232 for the location deviation 238 from the template location 236. The first control unit 512 can execute the intrusion module 704 to identify the intrusion 220 into the safety zone 216.

The first control unit 512 can execute the collision module 706 to identify the potential collision 224. The first control unit 512 can execute the pause module 708 to pause the physical activity 204. The first control unit 512 can execute the status module 710 to identify the elimination 230 of the dangerous situation 218. The first control unit 512 can execute the resume module 712 to resume the physical activity 204 after the elimination 230 of the dangerous situation 218.

The first communication unit 516 can be used by the deviation module 702, the intrusion module 704, and the collision module 706 to send and receive information. The first location unit 520 can use the deviation module 702, the intrusion module 704, and the collision module 706 to monitor the locations of participants and spectators.

In an example for the second device 106 of FIG. 5, the second software 542 of FIG. 5 can include the navigation system 100. For example, the second software 542 can include the deviation module 702, the intrusion module 704, the collision module 706, the pause module 708, the status module 710, and the resume module 712. The second control unit 534 of FIG. 5 can execute the second software 542.

The second control unit 534 can execute the deviation module 702 to monitor the performance round 232 for the location deviation 238 from the template location 236. The second control unit 534 can execute the intrusion module 704 to identify the intrusion 220 into the safety zone 216.

The second control unit 534 can execute the collision module 706 to identify the potential collision 224. The second control unit 534 can execute the pause module 708 to pause the physical activity 204. The second control unit 534 can execute the status module 710 to identify the elimination 230 of the dangerous situation 218. The second control unit 534 can execute the resume module 712 to resume the physical activity 204 after the elimination 230 of the dangerous situation 218.

The second communication unit 536 can be used by the deviation module 702, the intrusion module 704, and the collision module 706 to send and receive information. The second location unit 552 can use the deviation module 702, the intrusion module 704, and the collision module 706 to monitor the locations of participants and spectators.

In another example, the monitor module 612 can be partitioned between the first software 526 and the second software 542. For example, the first software 526 can include the deviation module. The second software 542 can include the intrusion module 704, the collision module 706, the pause module 708, the status module 710, and the resume module 712.

The second control unit 534 can execute modules partitioned on the second software 542 as previously described. The second communication unit 536, the second location unit 552, and the second display interface 540 can be used by the modules partitioned on the second device 106 as previously described.

The first control unit 512 can execute the deviation module 702 as previously described. The first communication unit 516, the first location unit 520, and the first display interface 530 can be used by the modules partitioned on the second device 106 as previously described.

It has also been discovered that the present invention provides the navigation system 100 for facilitating the planning, organizing, and observing of the physical activity 204, such as location-based games and performances. For example, spectators and participants can receive the event announcement 404 in the second notification 241 to learn about the physical activity 204. The navigation system 100 can generate the route 226 to the event location 402.

The navigation system 100 can also publish the conclusion 406 of the performance round 232 to spectators and participants. Participants will no longer get lost in large games such as hide and seek because the navigation system 100 can provide the participant with the route 226 to the event location 402 at the conclusion 406 of the performance round 232. After participants have returned to the event location 402, another instance of the performance round 232 of the physical activity 204 can be quickly started.

It has also been discovered that the navigation system 100 can improve safety by identifying the potential collision 224 by analyzing the travel speed 302, the vision field 304, and the proximity 306 of objects for increasing the safety of participants. The navigation system 100 can also identify the potential collision 224 using active and passive forms of radar, sonar, LIDAR, or other sensor technologies.

In has also been discovered that the navigation system 100 can provide safety features by pausing and resuming the physical activity 204 based on the dangerous situation 218 for improving the safety of spectators and participants. The navigation system 100 can identify the dangerous situation 218 and generate the notification 240. The navigation system 100 can pause the game timer or pause the music that can be associated with the physical activity 204. The navigation system 100 can resume the physical activity 204 if the dangerous situation 218 is removed from the safety zone 216.

The navigation system 100 describes the module functions or order as an example. The modules can be partitioned differently. For example, the monitor module 612 can include the deviation module 702, the intrusion module 704, the collision module 706, the pause module 708, the status module 710, and the resume module 712 as modules that are implemented as one module or with lesser number of modules. Each of the modules can operate individually and independently of the other modules.

Figure 8:
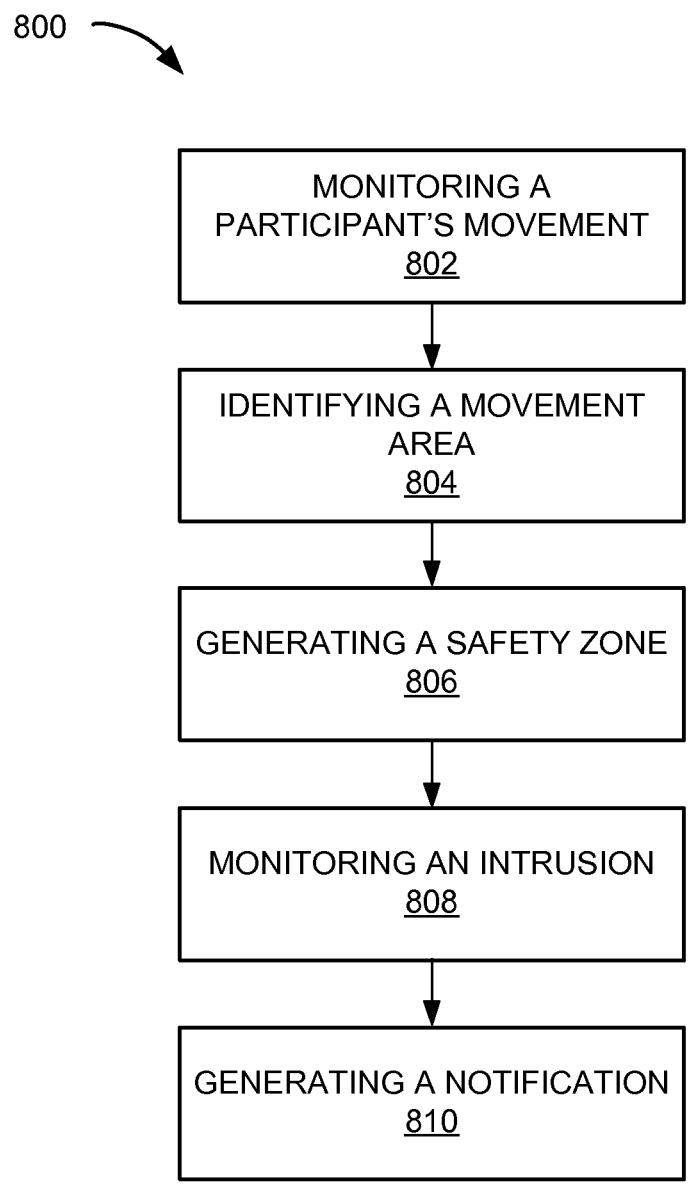
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The method 800 includes: monitoring a participant's movement, the participant's movement is movement to a sequence of locations in a block 802; identifying a movement area based on the participant's movement in a physical activity in a block 804; generating a safety zone encompassing the movement area in a block 806; monitoring an intrusion into the safety zone in a block 808; and generating a notification of a dangerous situation based on the intrusion for displaying on a device in a block 810.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    monitoring a participant's movement, the participant's movement is movement to a sequence of locations;
    identifying a movement area based on the participant's movement in a physical activity;
    generating a safety zone encompassing the movement area;
    monitoring an intrusion into the safety zone; and
    generating a notification of a dangerous situation based on the intrusion for displaying on a device.

2. The method as claimed in claim 1 wherein monitoring the intrusion includes:
    identifying a spectator's trespass into the safety zone; and
further comprising:
    generating a route from a spectator location to outside the safety zone.

3. The method as claimed in claim 1 further comprising:
    identifying the dangerous situation within the safety zone;
    pausing the physical activity based on the dangerous situation;
    identifying an elimination of the dangerous situation from the safety zone; and
    resuming the physical activity based on the elimination.

4. The method as claimed in claim 1 further comprising:
    identifying an obstacle within the safety zone; and
    modifying the safety zone to exclude the obstacle.

5. The method as claimed in claim 1 further comprising identifying a potential collision based on a vision field, a travel speed, and a proximity of a first participant location to an obstacle.

6. A method of operation of a navigation system comprising:
    monitoring a participant's movement, the participant's movement is movement to a sequence of locations;
    generating a practice template from the participant's movement;
    identifying a movement area based on the participant's movement in a physical activity;
    generating a safety zone encompassing the movement area;
    monitoring an intrusion into the safety zone;
    generating a notification of a dangerous situation based on the intrusion for displaying on a device; and
    displaying the practice template.

7. The method as claimed in claim 6 further comprising:
    identifying a template location from the practice template;
    monitoring a performance round for a location deviation from the template location; and
    generating a route from a first participant location to the template location.

8. The method as claimed in claim 6 further comprising:
    receiving a margin of error for a location deviation of the practice template;
    identifying a distance between a first participant location and a template location exceeding the margin of error; and
    generating a second notification of the location deviation.

9. The method as claimed in claim 6 further comprising:
    receiving an event announcement having an event location for the physical activity;
    generating a second notification of the event announcement; and
    generating a route to the event location.

10. The method as claimed in claim 6 further comprising:
    identifying a conclusion of a performance round of the physical activity; and
    generating a second notification of the conclusion of the performance round.

11. A navigation system comprising:
    a participant module for monitoring a participant's movement, the participant's movement is movement to a sequence of locations;
    a record module, coupled to the participant module, for identifying a movement area based on the participant's movement in a physical activity;
    a zone module, coupled to the record module, for generating a safety zone encompassing the movement area;
    a monitor module, coupled to the zone module, for monitoring an intrusion into the safety zone; and
    a notification module, coupled to the monitor module, for generating a notification of a dangerous situation based on the intrusion for displaying on a device.

12. The system as claimed in claim 11 further comprising:
    a navigation module, coupled to the zone module, for generating a route from a spectator location to outside the safety zone; and
wherein:
    the monitor module includes an intrusion module, coupled to the navigation module, for identifying a spectator's trespass into the safety zone.

13. The system as claimed in claim 11 further comprising:
    a pause module, coupled to the zone module, for pausing the physical activity based on the dangerous situation;

a status module, coupled to the pause module, for identifying an elimination of the dangerous situation from the safety zone;

a resume module, coupled to the status module, for resuming the physical activity based on the elimination; and wherein:

the monitor module is for identifying the dangerous situation within the safety zone.

14. The system as claimed in claim 11 further comprising:

an obstacle module, coupled to the recording module, for identifying an obstacle within the safety zone; and wherein:

the zone module is for modifying the safety zone to exclude the obstacle.

15. The system as claimed in claim 11 further comprising a collision module, coupled to the zone module, for identifying a potential collision based on a vision field, a travel speed, and a proximity of a first participant location to an obstacle.

16. The system as claimed in claim 11 wherein:

the record module is for generating a practice template from based on the participant's movement; and further comprising:

a display interface, coupled to the record module, for displaying the practice template.

17. The system as claimed in claim 16 wherein:

the monitor module is for monitoring a performance round for a location deviation from a template location; and further comprising:

a template module, coupled to the monitor module, for identifying the template location from a practice template; and a navigation module, coupled to the zone module, for generating a route from a first participant location to the template location.

18. The system as claimed in claim 16 further comprising:

an event module, coupled to the participant module, for receiving a margin of error for a location deviation of the practice template; and wherein:

the monitor module is for identifying a distance between a first participant location and a template location exceeding the margin of error; and the notification module is for generating a second notification of the location deviation.

19. The system as claimed in claim 16 further comprising:

an event module, coupled to the participant module, for receiving an event announcement including an event location for the physical activity;

a navigation module, coupled to the event module, for generating a route to the event location; and wherein:

the notification module is for generating a second notification of the event announcement.

20. The system as claimed in claim 16 further comprising:

a status module, coupled to the zone module, for identifying a conclusion of a performance round of the physical activity; and wherein:

the notification module is for generating a second notification of the conclusion of the performance round.

* * * * *